United States Patent [19]

Hsieh

[11] Patent Number: 5,024,121
[45] Date of Patent: Jun. 18, 1991

[54] HUB ASSEMBLY OF A BICYCLE AND THE LIKE

[76] Inventor: Kin H. Hsieh, No. 125, Shih Chien St., Feng Yuan City, Taiwan

[21] Appl. No.: 597,018

[22] Filed: Oct. 15, 1990

[51] Int. Cl.⁵ ............................................. G05G 1/14
[52] U.S. Cl. .................... 74/594.1; 74/594.2; 192/5
[58] Field of Search ............... 74/594.1–594.4; 192/5, 41 S, 6 B, 81 C, 107 T; 188/24.17, 82.6; 384/458

[56] References Cited

U.S. PATENT DOCUMENTS

| | | | |
|---|---|---|---|
| 3,578,829 | 5/1971 | Hata | 74/594.1 |
| 3,903,754 | 9/1975 | Morroni | 74/594.1 |
| 4,191,488 | 3/1980 | Bickerton | 74/594.1 X |
| 4,358,967 | 11/1982 | Kastan | 74/594.2 |
| 4,758,013 | 7/1988 | Agrillo | 132/5 X |
| 4,825,719 | 5/1989 | Romano | 74/594.4 |
| 4,883,368 | 11/1989 | Stein | 384/458 |

FOREIGN PATENT DOCUMENTS

| | | | |
|---|---|---|---|
| 8304338 | 7/1985 | Netherlands | 74/594.1 |
| 22225 | of 1898 | United Kingdom | 74/594.1 |
| 19424 | 3/1915 | United Kingdom | 74/594.1 |
| 543953 | 3/1942 | United Kingdom | 192/5 |
| 550064 | 12/1942 | United Kingdom | 192/5 |

Primary Examiner—Vinh T. Luong
Attorney, Agent, or Firm—Rogers, Howell & Haferkamp

[57] ABSTRACT

A hub is rotatably supported on an axle. A collar is fixed to one end of the hub. A number of rollers are rotatably supported on an outer surface of a frustum which is formed in the middle of the collar, and contact an inner surface of a sleeve. Two pawls are coupled on the free end of the collar. The sleeve has a ratchet gear formed in an inner surface for engagement with the pawls so that the collar can be driven to rotate unidirectionally by the sleeve. The rollers have a large contact surface so that the sleeve can be stably supported in rotational relationships with the collar.

1 Claim, 3 Drawing Sheets

HUB ASSEMBLY OF A BICYCLE AND THE LIKE

BACKGROUND OF THE INVENTION

1. Field of the Invention

The present invention relates to a hub assembly, and more particularly to a hub assembly of a bicycle and the like.

2. Description of the Prior Art

A bicycle hub is disclosed in U.S. Pat. No. 2,290,451 to Schwinn in the title of "Bicycle Hub and Method of Making It". The hub 12 is journaled on an axle 11 by ball bearings 13. The sprocket 39 is directly coupled to the hub 12 so that the hub 12 is directly driven to rotate by the sprocket 39. The hub 12 can not be driven unidirectionally. In addition, the hub is rotatably supported on the axle 11 by two ball bearing 13. The sliding contact surfaces of the balls are small so that the hub can not be stably supported on the axle and may vibrate after a long term of using.

The present invention has arisen to mitigate and/or obviate the afore-described disadvantages of the conventional hubs of bicycle and the like.

SUMMARY OF THE INVENTION

The objective of the present invention is to provide a hub assembly of a bicycle and the like, in which the hub of the hub assembly can be stably held in rotational relationships with the axle of the bicycle.

In accordance with one aspect of the invention, there is provided a hub assembly which has an axle. A hub has a first belled end formed on one end thereof and a second belled end formed on another end. A first cone is threadedly engaged to one end of the axle and a first ball bearing is received between the first belled end of the hub and the first cone. A collar has an enlarged diameter portion and a reduced diameter portion integrally coupled together by a frustum. The enlarged diameter portion is threadedly engaged with the second belled end of the hub. A number of oblong holes are formed on an outer surface of the frustum. A roller is rotatably received in each of the oblong holes. Two recesses and an annular groove are formed on the reduced diameter portion of the collar. A pawl is received in each of the recesses and a retaining ring is received in the annular groove for biasing the free ends of the pawls outward. A sleeve has an annular flange and an annular rib formed in an inner surface. A tapered surface is formed on one end of the annular flange for sliding engagement with the rollers. A number of ratchet gear teeth are formed in an inner surface of the annular flange for engagement with the pawls so that the collar and the hub can be driven to rotate unidirectionally. A second cone is threadedly engaged to another end of the axle. A second ball bearing is received between the second cone and the annular rib. The contact surfaces among the annular flange and the rollers are relatively large so that the sleeve can be stably supported in rotational relationships with the collar.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
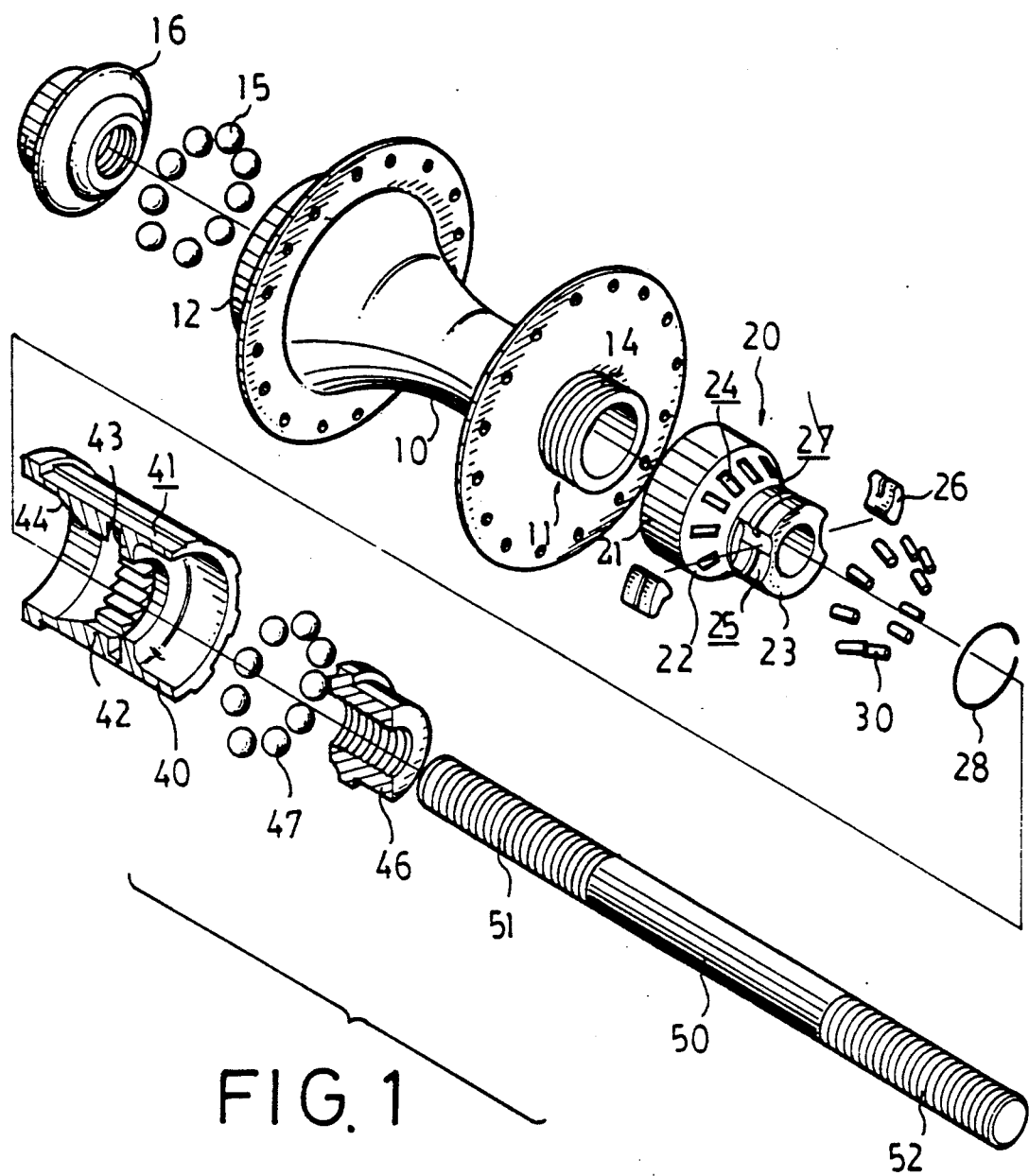
FIG. 1 is an exploded view of a hub assembly in accordance with the present invention.
Figure 2:
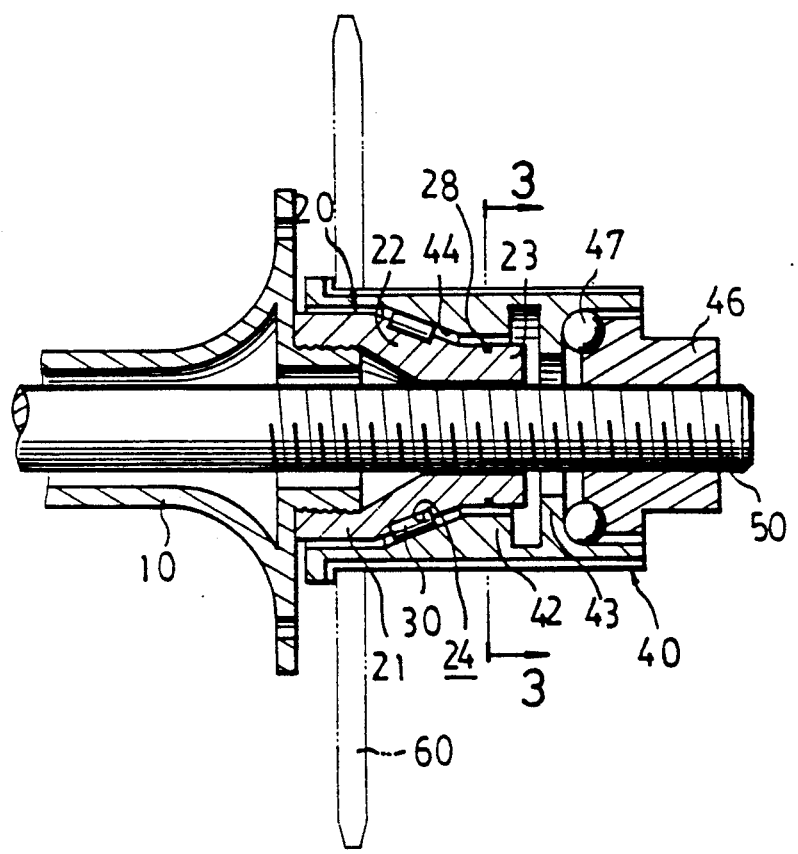
FIG. 2 is a partial cross sectional view of a hub assembly showing a longitudinal cross section of a hub on an axle.

Referring to the drawings and initially to FIGS. 1 and 2, a hub assembly in accordance with the present invention comprises generally a hub 10 rotatably coupled on an axle 50, and a sprocket 60 engaged on a sleeve 40 which is fixed on one end of the hub 10 so that the hub 10 can be driven to rotate by the sprocket 60.

A belled end 11, 12 is formed on each end of the hub 10. An outer thread 14 is formed on the belled end 11. An outer thread 51, 52 is formed on each end of the axle 50. A cone 16 is threadedly engaged with the outer thread 51 of the axle 50 so that the cone 16 and the axle 50 rotate in concert. A ball bearing 15 is received between the belled end 12 and the cone 16 so that the hub 10 is rotatable relative to the cone 16 and the axle 50.

A collar 20 has an enlarged diameter portion 21 and a reduced diameter portion 23 integrally coupled together by a frustum or a tapered portion 22. The enlarged diameter portion 21 has an inner thread formed therein for threadedly engaging with the outer thread 14 of the belled end 11. A plurality of oblong holes 24 are formed on the outer tapered surface of the frustum 22. A roller 30 is rotatably received in each of the oblong holes 24. Two recesses 25 and an annular groove 27 are formed on the outer peripheral surface of the reduced diameter portion 23. A pawl 26 is received in each of the recesses 25. A retaining ring 28 is coupled over the pawls 26 in the annular groove 27 in order to bias the free ends of the pawls 26 outwards resiliently.

Figure 3:
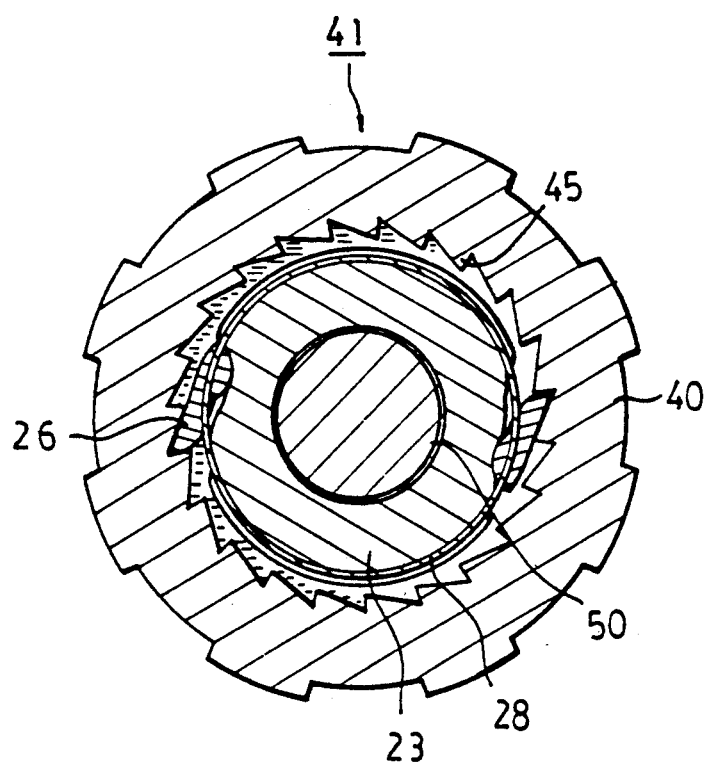
FIG. 3 is a cross sectional view taken along lines 3—3 of FIG. 2.

The sleeve 40 has a plurality of longitudinal grooves 41 formed on the outer peripheral surface thereof for engagement with corresponding keys (not shown) formed in the sprocket 60 so that the sleeve 40 can be driven to rotate by the sprocket 60. An annular flange 42 and an annular rib 43 are formed in the middle portion of the inner surface of the sleeve 40. A tapered surface 44 is formed on an inner end of the annular flange 42 for sliding engagement with the rollers 30. A plurality of ratchet gear teeth 45 are formed in the inner circular surface of the annular flange 42. As is best shown in FIG. 3, the pawls 26 are engaged with the ratchet gear teeth 45 so that the collar 20 can be driven to rotate unidirectionally by the sleeve 40. A cone 46 is threadedly engaged with the outer thread 52 of the axle 50. A ball bearing 47 is slidably received between the annular rib 43 and the cone 46.

In operation, the collar 20 and thus the hub 10 are driven to rotate unidirectionally by the sprocket 60 via the sleeve 40. The contact surfaces among the rollers 30 and the tapered surface 44 are relatively enlarged so that the sleeve 40 can be stably supported in rotational relationships with the collar 20.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hub assembly comprising an axle having an outer thread formed on each end thereof; a hub having a first belled end formed on one end thereof and a second belled end formed on another end thereof; a first cone threadedly engaged to one end of said axle; a first ball bearing received between said first belled end of said hub and said first cone; a collar having an enlarged diameter poriton and a reduced diameter portion integrally coupled together by a frustum, said enlarged diameter portion being threadedly engaged with said second belled end of said hub, a plurality of oblong holes being formed on an outer surface of said frustum, a roller being rotatably received in each of said oblong holes, at least one recess and an annular groove being formed on an outer peripheral surface of said reduced diameter portion of said collar, a pawl being received in each recess, a retaining ring being received in said annular groove for biasing a free end of each pawl outwards; a sleeve having an annular flange and an annular rib formed in an inner surface thereof, a tapered surface being formed on one end of said annular flange for sliding engagement with said rollers, a plurality of ratchet gear teeth being formed in an inner surface of said annular flange for engagement with said pawl so that said collar and said hub can be driven to rotate unidirectionally by an engagement between said pawl and said ratchet gear teeth; a second cone threadedly engaged to another end of said axle; a second ball bearing received between said second cone and said annular rib; and said annular flange and said rollers having a large contact surface so that said sleeve can be stably supported in rotational relationships with said collar.

* * * * *